(12) United States Patent
Lee et al.

(10) Patent No.: US 6,445,832 B1
(45) Date of Patent: Sep. 3, 2002

(54) BALANCED TEMPLATE TRACKER FOR TRACKING AN OBJECT IMAGE SEQUENCE

(75) Inventors: Harry C. Lee, Maitland; Dat Nguyen, Orlando, both of FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/684,817

(22) Filed: Oct. 10, 2000

(51) Int. Cl.$^7$ ................................................. G06K 9/00
(52) U.S. Cl. ........................ 382/266; 382/103; 382/209
(58) Field of Search ................................. 382/100, 103, 382/173, 181, 190, 199, 203, 236, 215–221, 266, 269, 283, 291, 284; 348/458; 709/247; 345/449

(56) References Cited

U.S. PATENT DOCUMENTS

| | | | | |
|---|---|---|---|---|
| 4,644,585 A | | 2/1987 | Crimmins et al. | 382/283 |
| 5,062,056 A | | 10/1991 | Lo et al. | 235/411 |
| 5,259,040 A | * | 11/1993 | Hanna | 382/107 |
| 5,282,255 A | * | 1/1994 | Bovik et al. | 382/239 |
| 5,351,310 A | | 9/1994 | Califano et al. | 382/199 |
| 5,657,251 A | | 8/1997 | Fiala | 342/162 |
| 5,724,435 A | | 3/1998 | Malzbender | 382/199 |
| 5,748,775 A | | 5/1998 | Tsuchikawa et al. | 382/190 |
| 5,768,536 A | * | 6/1998 | Strongin et al. | 709/247 |
| 5,796,438 A | * | 8/1998 | Hosono | 348/458 |
| 5,832,124 A | * | 11/1998 | Sato et al. | 382/238 |
| 5,940,538 A | * | 8/1999 | Spiegel et al. | 382/236 |
| 5,947,413 A | | 9/1999 | Mahalanobis | 244/3.17 |
| 5,960,097 A | | 9/1999 | Pfeiffer et al. | 382/103 |
| 5,995,115 A | * | 11/1999 | Dickie | 345/441 |
| 6,005,609 A | | 12/1999 | Cheong | 348/169 |
| 6,075,905 A | * | 6/2000 | Herman et al. | 382/284 |

OTHER PUBLICATIONS

Zhou et al., "Edge Detection and Linear Feature Extraction Using a 2–D Random Field Model", IEEE Transactions On Pattern Analysis and Machine Intelligence, Jan. 1989, pp. 84–95.*

Laree et al., "A Step Edge Detector Algorithm Based on Symbolic Analysis", IEEE 1994, pp. 6–10.*

* cited by examiner

Primary Examiner—Jayanti K. Patel
(74) Attorney, Agent, or Firm—Burns, Doane, Swecker & Mathis, LLP

(57) ABSTRACT

A method and apparatus are described for tracking an object image in an image sequence in which a template window associated with the object image is established from a first image in the image sequence and an edge gradient direction extracted. A search window associated with the object image is established from a second image in the image sequence and a second edge gradient direction associated with the search window extracted. The first and second edge gradient directions are weighted and correlated to provide a coordinate offset between relative positions of the object image in the search and template windows to track the object image in the image sequence. If the coordinate offset exceeds a predetermined value the template window is updated by establishing a new template window. Weighting further includes calculating a set of weighting coefficients for the edge gradient direction associated with the search window and the template window respectively such that a balanced contribution is provided from respective edge gradient directions in correlation. The edge direction gradient associated with the template window is auto-correlated to determine a quality measure. Extracting the second edge gradient direction further includes I filtering the second edge gradient direction and an edge magnitude, thinning the second edge gradient direction, thresholding the edge magnitude, and normalizing the second edge gradient direction if the edge magnitude is successfully thresholded.

12 Claims, 10 Drawing Sheets

BALANCED TEMPLATE TRACKER FOR TRACKING AN OBJECT IMAGE SEQUENCE

BACKGROUND

The present invention relates to image processing. More particularly, the present invention relates to image processing in target tracking systems.

Image target tracking is normally considered an autonomous process, which locates and thus tracks a particular predetermined or marked object in each successive frame of an image sequence. Image sequences for target tracking can be generated via electro optical sensors or through synthetic means such as computer generation which produce a synthesized image from, for example, data collected from non-optical sensors or, alternatively, may be produced from simulation data. The image sequence through which an object is tracked in a typical sequence usually amounts to a relatively stable video image when viewed at a constant repetition rate. Problems arise however when there is a large degree of movement of a tracked object within an image frame, particularly when the movement is discontinuous, e.g. there are large non-smooth movements from one frame to another. It becomes difficult for prior art target trackers to remain fixed on a selected target both as the scene moves forward in time through the image frames which comprise the sequence and the target moves about through the scene.

Modern target trackers fall into different categories depending on how they process information related to tracking a target or object. Feature based trackers, for example, process an image to first identify and segment out a candidate region for tracking in which a target is most likely to be present. Then, feature measures may be made of the candidate region. On the next frame of data the same process is applied to a region where the target can be found. Since the overall search region, e.g. the image frame, in the next image of the sequence is larger than the candidate or template region segmented from the original image frame, more than one segmented region may be extracted. If this is the case all segmented regions are treated the same and feature measurements are made of each. Next, it may be determined which set of features best matches the template, typically by using, for example, a distance measure in feature space. Accordingly, the set of features "closest" to the template in terms of the distance metric is nominated as the new target track location. It should be noted that while feature based trackers are effective at tracking targets which remain fairly stationary within the frame, the computational load increases for scenes which contain multiple targets and/or scenes where targets are characterized by high degrees of motion including discontinuous inter-frame motion.

Another category of target trackers includes correlation trackers. Correlation trackers uses the template image to run a cross correlation with, for example, a search window or region to find the best match or highest degree of correlation between the template and the contents of the search window or search region. Correlation trackers evolved from trackers as described above, but with added constraints imposed on accomplishing the goal tracking, e.g. limited computing power, limited memory, and the like. Some original trackers included severe constraints in that they were primarily built using analog circuits and performed target tracking processing using discrete analog circuits.

In U.S. Pat. No. 5,724,435 to Malzbender, a digital filter and method of tracking a structure extending in three spatial dimensions is described wherein a 3D model is used as a stored reference which is compared with an image object to attempt to obtain a match. All rotations of the reference model are compared to get a best match. U.S. Pat. No. 5,351,310 to Califano et al. describes a generalized shape autocorrelation for shape acquisition and recognition. Objects may be tracked using a model of a target of interest. Tracking quantities primarily are local shape descriptors. In U.S. Pat. No. 4,644,585 to Crimminset al., a method and apparatus are described for automatic shape recognition. In this Automated Target Recognition system internal shape of an object may be used to make a recognition match however no tracking is described. In U.S. Pat. No. 5,960,097 to Pfciffer et al., a system for background adaptive target detection and tracking with multiple observation and processing stages is described wherein target tracking operators point type tracking approaches of partial resolved targets. In U.S. Pat. No. 5,657,251 to Fiala, a system and process for performing optimal target tracking, is described addressing a track file technique used in tracking multiple targets from frame to frame. Un U.S. Pat. No. 5,748,775 to Tsuchikawa et al. a method and apparatus are described for moving object extraction based on background subtraction. The approach uses background removal to determine residue information that can be determined to be a moving object. In U.S. Pat. No. 5,062,056 to Lo et al., a method and apparatus are described for tracking a target immersed in background clutter. An object tracker and a correlation tracker are used synergistically to provide tracking error signals. In U.S. Pat. No. 5,947,413 to Mahalanobis a correlation filter for target reacqusition is described. Therein an iterative process includes DCCFs, DCCP, and MACH filters to update aimpoint and re-designate targets. In U.S. Pat. No. 6,005,609 to Cheong, a method and apparatus is described for digital correlation object tracking using a shape extraction focalization.

SUMMARY

Accordingly, a method and apparatus are described for tracking an object image in an image sequence. The method and apparatus may provide precision tracking of the object image, which may be an actual target or which may be an object, such as a virtual target provided from, for example, a simulator.

Thus, in accordance with various exemplary embodiments of the present invention, a template window associated with the object image from a first image in the image sequence may be established and a first edge gradient direction associated with the template window extracted therefrom. A search window associated with the object image may be established from subsequent images in the image sequence. A second edge gradient direction associated with the search window may then be extracted. It should be noted that the search and template windows may be established using a process such as feature extraction or the like. In order to provide balanced tracking in an exemplary correlator, the first and second edge gradient directions may be weighted according to weights or weighting coefficients which allow contributions from edges of different strengths to be normalized, adjusted or otherwise balanced. Accordingly, weighting may further include calculating a set of weighting coefficients for the edge gradient direction associated with the search window and the template window respectively such that a balanced contribution is provided from edge gradient directions associated with the search window and the template window in the step of correlating. It should be noted that balancing may include equal weighting among edge gradient directions, or alternatively may include weighting to achieve, for example, emphasis and de-emphasis according to, for example, the relative strength or weakness of edges. The first and second edge gradient directions may further be weighted to track the object image over one or more images in the image sequences.

Further in accordance with various exemplary embodiments of the present invention, correlation may further include providing a coordinate offset between a coordinate position of the object image in the search window and a coordinate position of the object image in the template window. It should be noted that if the coordinate offset provided during correlation exceeds a predetermined value, the template window may be updated by establishing a new template window from the image sequence using, for example, the current image in the image sequence or a subsequent image from the sequence after the offset which exceeds the predetermined value is discovered. In accordance with various alternative exemplary embodiments, the edge direction gradient associated with the template window may be auto-correlated to determine a quality measure associated with the template window prior to correlating.

Still further in accordance with various exemplary embodiments of the present invention, extraction of the edge gradient direction associated with the search window may further include Sobel filtering the search window edge gradient direction and an associated edge magnitude. The second edge gradient direction may then be thinned and the associated edge magnitude may be thresholded. If the associated edge magnitude is successfully thresholded, the second edge gradient direction may be normalized.

BRIEF DESCRIPTION OF THE DRAWINGS

The objects and advantages of the invention will be understood by reading the following detailed description in conjunction with the drawings, in which.

DETAILED DESCRIPTION

Figure 1A:
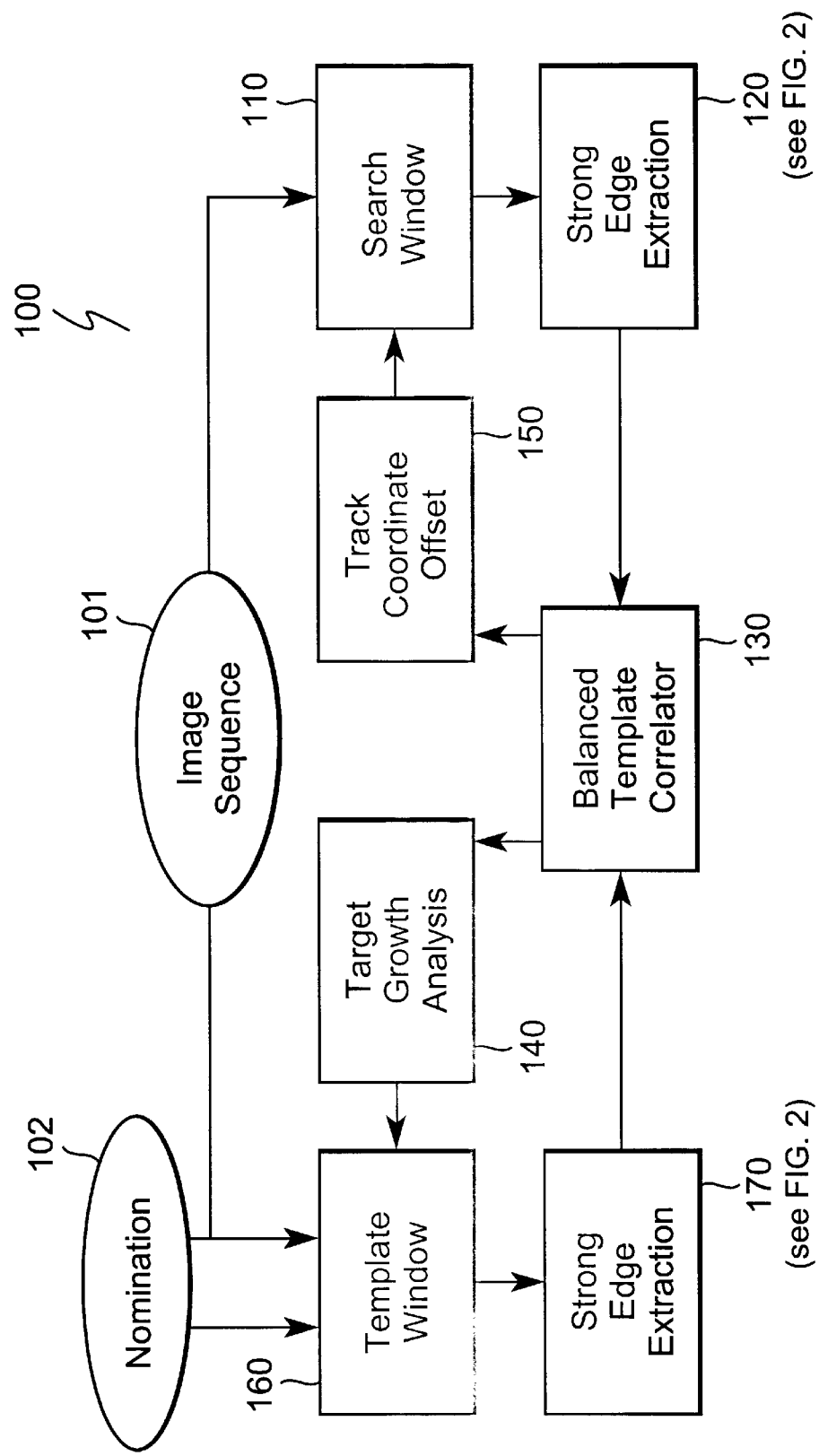
FIG. 1A is a flow diagram illustrating an exemplary balanced template tracker in accordance with the present invention.
Figure 2A:
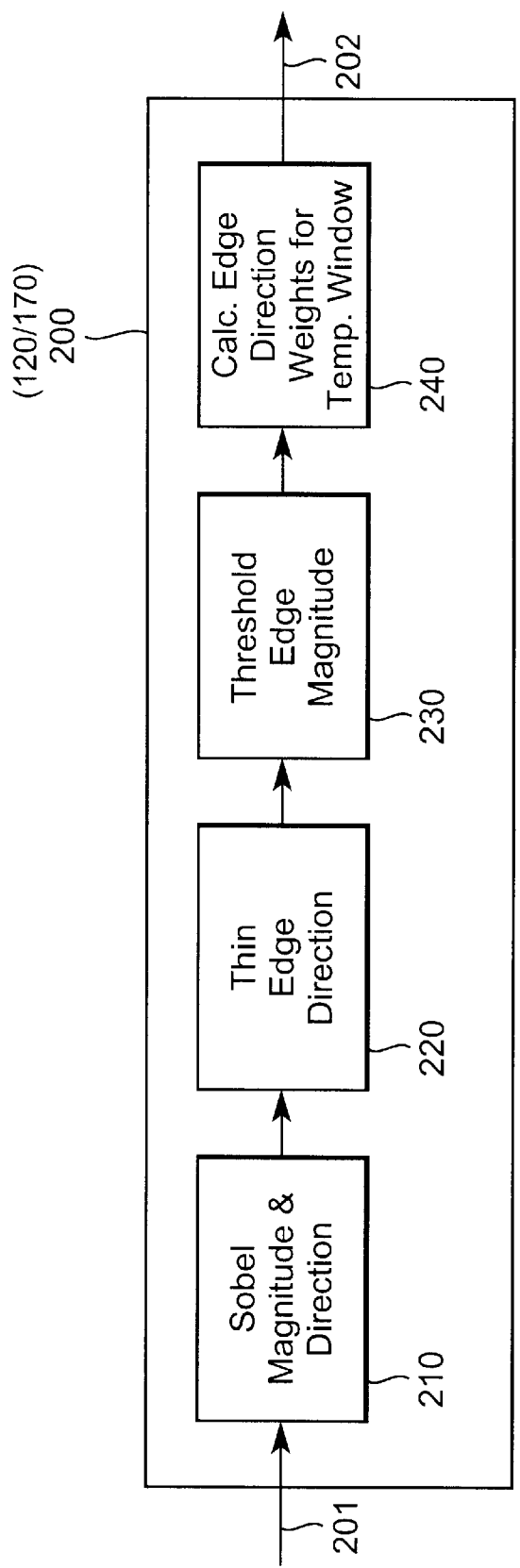
FIG. 2A is a flow diagram illustrating exemplary strong edge extraction in accordance with the present invention.

In accordance with various exemplary embodiments of the present invention, balanced template tracker 100, as illustrated in FIG. 1A, may be capable of implementing a method and apparatus for tracking an object image in, for example, image sequence 101. It should be noted that the object image may represent an actual target or alternatively, may represent a simulated target or like object within a view field as may be established using, for example, a target acquisition system or, for example, a simulator, or the like. Such a target acquisition system, simulator, or the like, may include operator input for viewing a scene and providing, for example, nomination 102. Alternatively, nomination 102 may be provided automatically, particularly in the case of a simulator. Accordingly, a template window associated with the object image may be established in routine 160 using, for example, feature extraction or feature window extraction or the like, from an image in image sequence 101. From the template window, an edge gradient direction associated with the template window may be extracted using methods as will be described in greater detail hereinafter, particulary with regard to FIG. 2A. A search window associated with the object image may be established in routine 110 from an image in image sequence 101 and a corresponding edge gradient direction associated with the search window may be extracted, again, as will be further described hereinafter, particularly with regard to FIG. 2A. The first and second edge gradient directions may then be weighted in a manner such that object image tracking may be accomplished without being unduly influenced by contributions from, for example, persistent vertical edges or without being provided insufficient contributions from, for example, weak or transient, but important, edges in a particular scene accompanying an object image. Preferably, weighting should provide balanced contributions from all edges in a scene prior to correlating the first and second edge gradient directions to track the object image over one or more images in the image sequences.

It should be noted that a Balanced Template Tracker (BTT) of the present invention may be considered an image-based, frame-to-frame correlation tracker useful for tracking static targets such as, for example, buildings, bunkers, and bridges. The BTT differs from prior art image-based correlation trackers in that it uses weighted edge directions in performing correlation. One benefit of using weighted edge directions includes reducing the dominance of strong edges in the scene which may not be part of the target but which may confuse prior art trackers.

Accordingly, again as illustrated in FIG. 1A, balanced template tracker 100 may correlate one or more template regions obtained from an initial analysis of an image frame acquired using, for example, an automatic acquisition system. In such a system, an operator may interface with, for example, a pre-screener and nominate one or more candidate target locations. Target candidate regions may further be processed using segmentation to establish target region boundaries. A feature set may then be calculated for reach candidate region using methods known in the art. Nomination 102 may represent one of the one or more regions whose feature sets have been positively classified as targets by, for example, a target classification routine as is known in the art. After target nomination, image sequence 101 may further be processed by establishing, preferably through feature extraction, a search window as in routine 110 in order to track object images, such as targets, throughout image sequence 101 which evolves spatially and temporally with regard to the target. As previously described, cleaned edge directions may be weighted as will be described in greater detail herein after, and used in matching criteria. Accordingly, a resulting match metric is less sensitive to contrast then in prior art tracking techniques. By using weighted edge directions to correlate objects equal importance may be placed on edge directions which may occur many times or a few times by, for example, reducing the emphasis on strong edges which occur from frame to frame in image sequence 101 and emphasizing edges that occur less frequently.

As previously noted, the first step in an exemplary process in accordance with the present invention involves creating a template of the target to be tracked. On the first frame of image data, a region may be nominated around the object to be tracked in nomination 102. Nomination 102, may be seen more readily in FIG 1C. Therein, image 101a of image sequence 101 represents a scene including, for example, three objects that could be desirable to track. Each object may be subject of nomination 102 as illustrated by drawing a box around the object using a cursor, or may alternatively be "touched" and contrast highlighted, "rubberbanded", or otherwise, for example, placed within cross-hairs and then best segmented. A template may then be established as described, using, for example, feature extraction, from nomination 102 in routine 160 along with the calculation of the initial track coordinates. The template may then be processed by strong edge extraction routine 170 to obtain robust edges to be used in balanced template correlator 130. A search window may then be established, again preferably using feature extraction, in routine 110 from a frame in image sequence 101 in accordance with the initial track coordinates. The search window location may be subsequently augmented by information from the image plane motion relative the inertial coordinate system to generate a coordinate offset as in routine 150. The track coordinate offset may be used, for example, to provide a best seed point to start the searching process. After receiving both processed images, e.g from template and search windows through strong edge extraction routines 120 and 170, output from balanced template correlator 130 may be used to determine, for example, a new offset in track coordinate offset routine 150, which offset may then be used in processing a subsequent frame of image sequence 101.

Figure 1B:
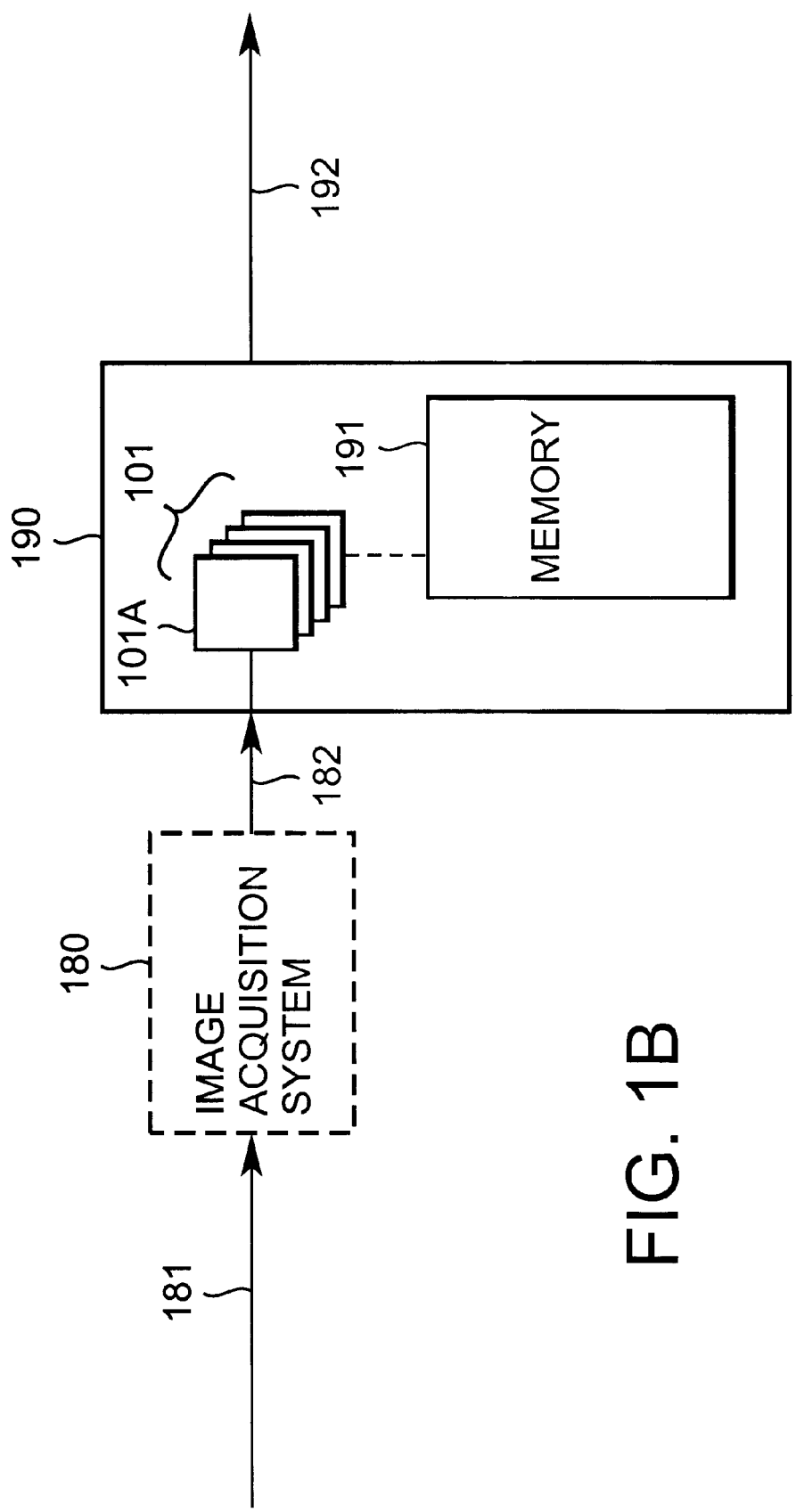
FIG. 1B is a block diagram illustrating an exemplary balanced template tracker in accordance with the present invention.
Figure 1C:
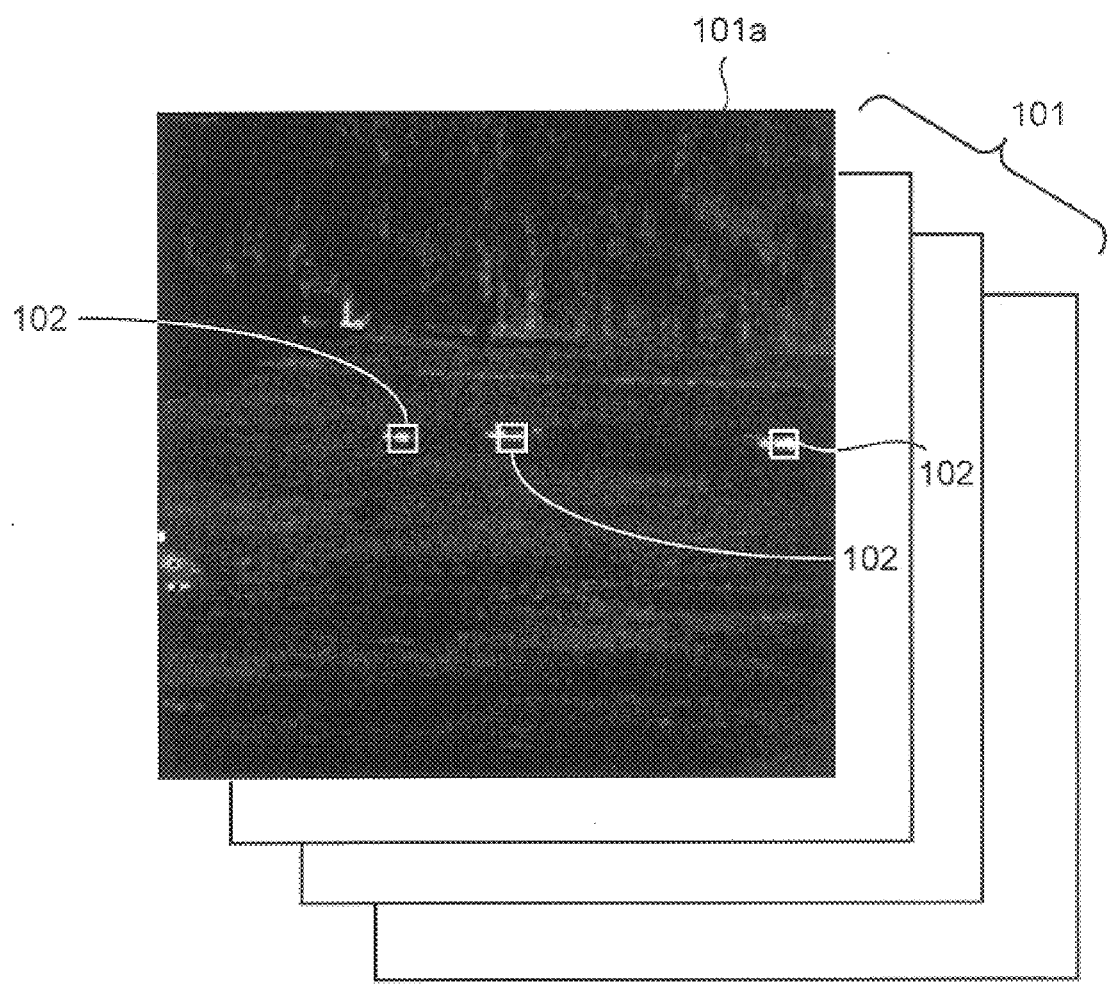
FIG. 1C is a diagram further illustrating exemplary target nomination in accordance with the present invention.

Accordingly, as will be appreciated by those skilled in the art, balanced template correlator 100, in accordance with various exemplary embodiments of the present invention, may be implemented, as illustrated in FIG. 1B, in processor 190, which may include, for example, any of the Intel Pentium chip sets used in standard desktop PC's. A typical balanced template correlator in accordance with the present invention can be written in standard C, or C++ and is running on a 500 mhz desktop PC in real time (30 times/second frame rate). It should be noted that a DSP chip set will improve performance allowing, for example, multiple trackers to run concurrently in real time. Other candidate processors/systems may include Sun systems, Apple, and the like processor in the 200 mhz speed range or higher as is known in the art. Further, processor 190, may be a specially designed processor which is optimized for performing image processing operations and includes predetermined coefficients or the like. Processor 190 may further include memory 191 for storing data such as, for example, search and template windows, weighting coefficients, program instructions, tracking coordinates, intermediate results, and, for example, data associated with image sequence 101. It should be noted that input 181 may include sensor input from, for example, target image sensors such as infrared sensors or the like, or may further include simulator input, with the typical frame size of an image frame within image sequence 101, being 256×256 pixels although the frame size may be larger or smaller depending on factors such as processing speed/power of processor 190. Block 180 may optionally be present and may accordingly represent, for example, an automatic target acquisition system, a simulator, or the like for generating digital data 182 for representing image sequence 101. Processor 190 may operate on data associated with image sequence 101, and may provide a variety of output 192 such as for example, a correlation surface, updated target coordinates to, for example, sensor control units, simulators, or the like, and may additionally provide feedback input to internal processes as will be described hereinafter it should be noted that strong edge extraction routines 120 and 170 as previously described and illustrated, for example, in FIG. 1A, are illustrated in greater detail in FIG. 2A, may produce a robust set of edges and corresponding edge directions for use by, for example, balanced template correlator 130. Edge extraction section 200 which may correspond to, for example, routines 120 and 170 of FIG. 1A, may further include an edge filter or like operator for extracting, at a minimum, edge direction and magnitude. While an exemplary Sobel operator has been selected for illustrative purposes, any operator for extracting edge direction and magnitude such as, for example, a Kirsch operator, Canny operator, a Sobel detector operator, or Sobel gradient or edge filters as is known in the art may be used and applied to, for example, image template as extracted in routine 160, to obtain preferably direction edge image as in routine 210 for later correlation. It should be noted that the template window should preferably be of sufficient size to encompass the target and a small amount of background or alternatively, when the image sequence includes closing in on a large target, a structural piece of the target, which may then be locked on throughout the tracking process. Edge magnitude and direction may be thinned in routine 220 to retain only the strongest or most persistent edges by removing the weaker edge pixels which lie next to strong edge pixels effectively skeletonizing edges within the window region thus retaining those edges that will be most reliable for correlation within, for example, balanced template correlator 130. It should be noted that edge thinning routine 220 may preferably be a directionally guided magnitude filter. Thus, the direction of each pixel in the window region determines which neighboring pixels in the magnitude image associated with the particular window region to remove. During edge thinning routine 220, preferably both edge magnitude and direction pixels are thinned in window images. It should further be noted that edge extraction section 200 may be different for the template window image and the search window image. In particular, the search window image edges are not thinned to allow additional flexibility in subsequent correlations. In other words, by not thinning search window image edges, the correlation between the search and template window image edges is slightly less exact resulting in a higher degree of likelihood of a positive correlation between the template and search windows. Resulting edge magnitudes may be applied against a selected threshold in thresholding routine 230 so that approximately 20% of edges are retained. It should be noted that the threshold value may be dynamically chosen such that a fixed percentage of the pixels in the template window image remain. Typically for a small template window image, e.g. 9×9, about 40% of the pixels are allowed to exceed the threshold. As the reference window increases in size, about 20% of the edge pixels are allowed to exceed the threshold. By fixing the percentage of pixels that remain, the actual threshold value can vary based on scene dynamics.

The threshold value which is used to threshold the template window image is used to threshold the search window image. Once the threshold has been applied and certain edge magnitudes are retained, corresponding edge direction pixels are also retained. Thresholded output from exemplary thresholding routine 230 generated from both strong edge extraction routines 120 and 170 operating on template window extracted in routine 160 and search windows extracted during routine 110 may be used during correlation in balanced template correlator 130 as will be described in greater detail hereinafter.

Figure 2B:
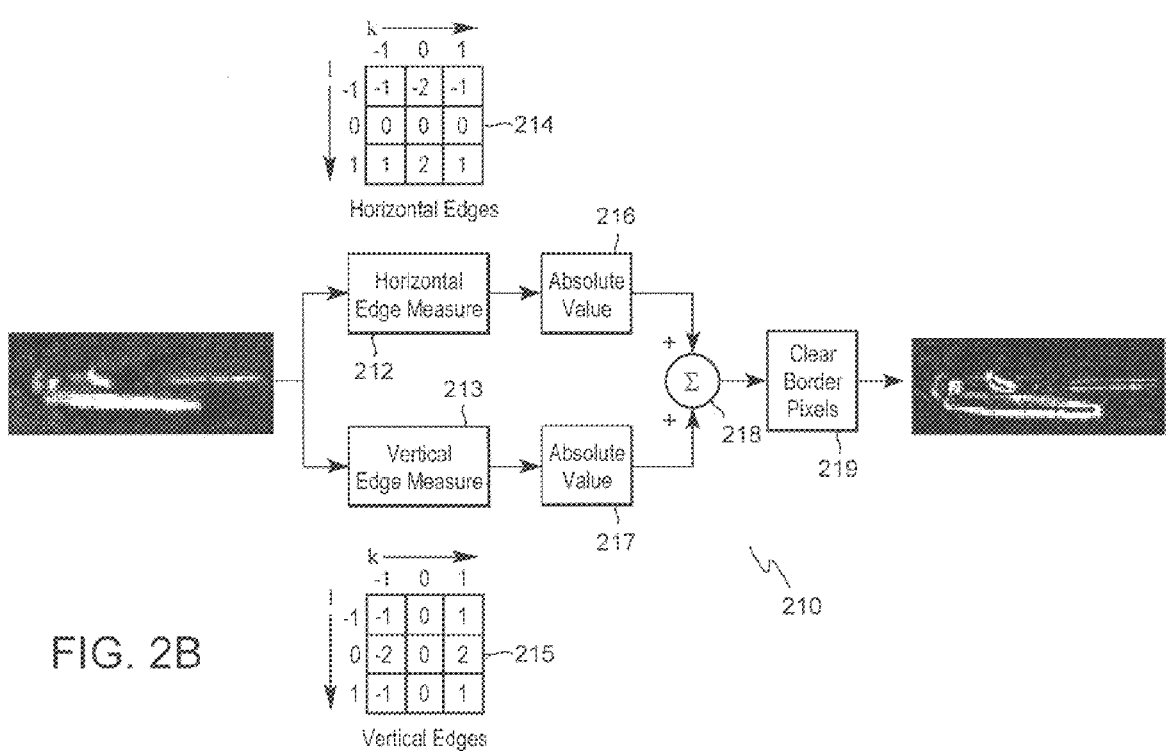
FIG. 2B is a block diagram illustrating application of an exemplary Sobel in accordance with the present invention.

Thus, exemplary edge extraction section 200 may be seen in greater detail in FIG. 2B. In particular, Sobel routine 210 receives, for example, input image 201 which may be, for example, the template window wich has been extracted from image sequence 101. Both horizontal and vertical edge measures may be taken, for example, in routines 212 and 213 respectively prior to correlation. It should be noted that the template window image should be large enough to encompass an object to be tracked, but will necessarily be smaller than the maximum allowable window size. Typically, the template window image is obtained from the first frame of the image sequence 101 after it has been designated, as previously described, for example, by an operator or an automatic target acquisition routine. Horizontal Sobel edge operator 214 and vertical Sobel edge operator 215 may be applied to input image 201, and are preferably 3×3 gradient filters used to extract the edges from raw image data of input image 201. In FIG. 2B, input image 201 may represent, for example, a grayscale image from FLIR data of a vehicle. Output image 202 shows the corresponding Sobel edge magnitude image.

It should be noted that the Sobel edge magnitude image represented by exemplary output image 202 may be obtained by convolving input image 201 with horizontal Sobel edge operator 214 and vertical Sobel edge operator 215 and combining the results at summing junction 218. The equations for computing a 2-D convolution using the horizontal and vertical components of the Sobel are:

$$H(x, y) = \sum_{k=-1}^{1} \sum_{l=-1}^{1} h(k, l) \, INPUT(x+k, y+l) \quad (1)$$

$$V(x, y) = \sum_{k=-1}^{1} \sum_{l=-1}^{1} v(i, j) \, INPUT(x+k, y+l) \quad (2)$$

where $H(x,y)$ is the output horizontal edge component, $V(x,y)$ is the output vertical edge component, $h(i,j)$ is the horizontal filter kernel, and $v(i,j)$ is the vertical filter kernel. From the above definitions, it is assumed that the center of each 3×3 edge operator is $h(0,0)$. The Sobel magnitude is given by:

$$M(x,y)=|H(x,y)|+|V(x,y)| \quad (3)$$

It should be noted that EQ 3 is a shortcut to how the true Sobel is computed, $M=(H^2+V^2)^{1/2}$ which decreases the computational load during implementation. Respective portions of EQ 3 may accordingly be implemented in horizontal and vertical absolute value routines 216 and 217. After combination at summing junction 218, 1×1 border region around the image is removed in border clearing routine 219 since data around the edges are invalid after Sobel filtering.

Figure 2C:
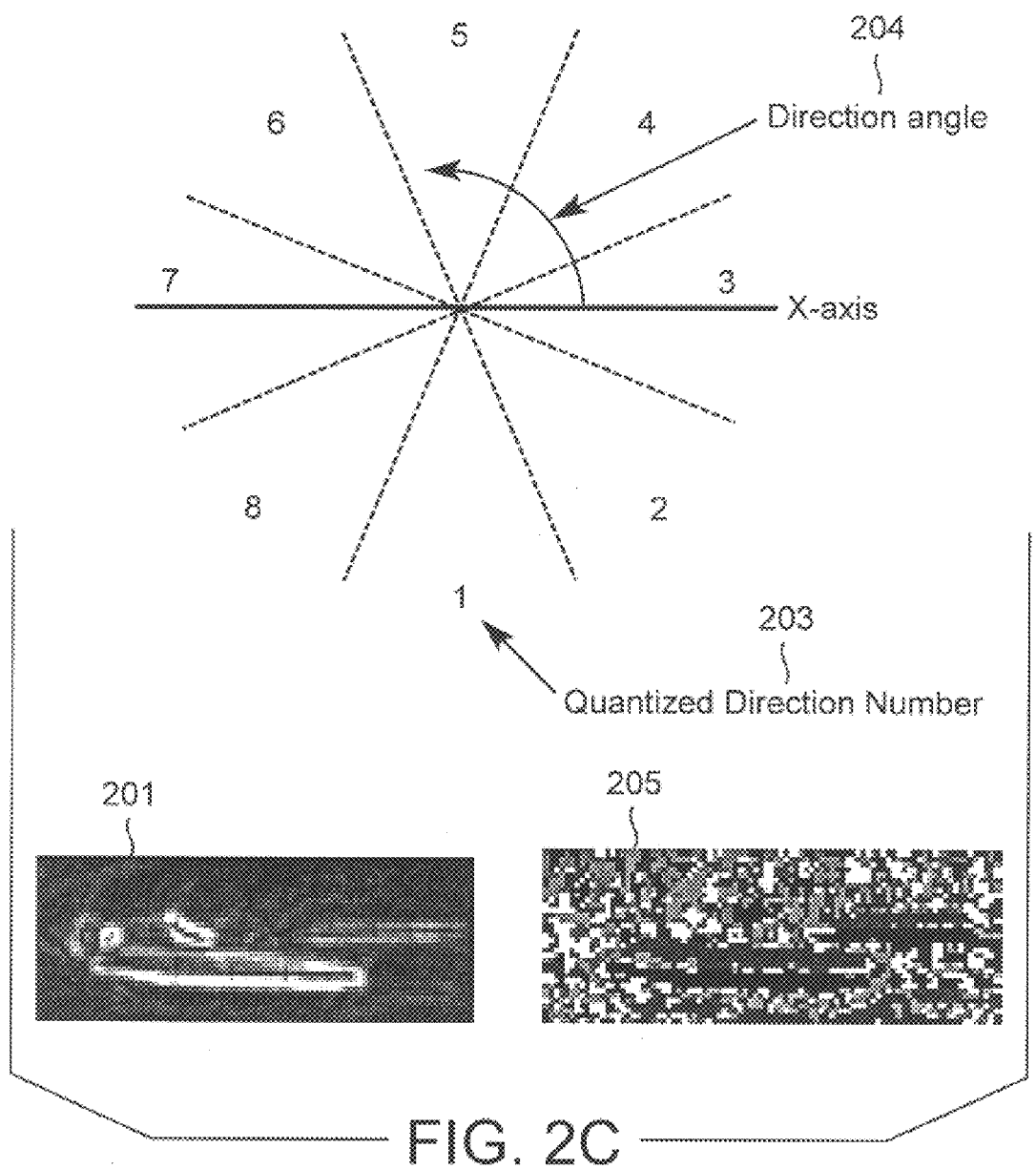
FIG. 2C is a flow diagram illustrating exemplary Sobel direction number and angle in accordance with the present invention.

As is further illustrated in FIG. 2C, edge direction image 205 is created by calculating direction angle 204 at each pixel and quantizing direction angle 204 to an integer valued direction number 203. In accordance with various exemplary embodiments of the present invention, and in accordance with the example as illustrated in FIG. 2C, direction angle 204 is preferably quantized into eight unique direction numbers 203. If greater precision is desired direction angle 204 may be quantized to a higher number of integer values for direction number 203. Thus, direction angle 204 can be computed at each pixel using the equation:

$$A(x,y)=\arctan(V(x,y)/H(x,y)) \quad (4)$$

Where $V(x,y)$ is the vertical Sobel edge component and $H(x,y)$ is the horizontal Sobel edge component of, for example Sobel output image 202 at position x,y. It should be noted that since eight direction numbers 203 are used in the present example, each direction number 203 has 360/8=45 degrees of range. As one exemplary final result of routine 210, an edge magnitude image 201 and corresponding edge direction image 205 are produced. Direction image 205 while shown for convenience as a gray scale image may preferably be color coded such that each of the eight direction numbers 203 is mapped to a unique color for display.

Figure 2D:
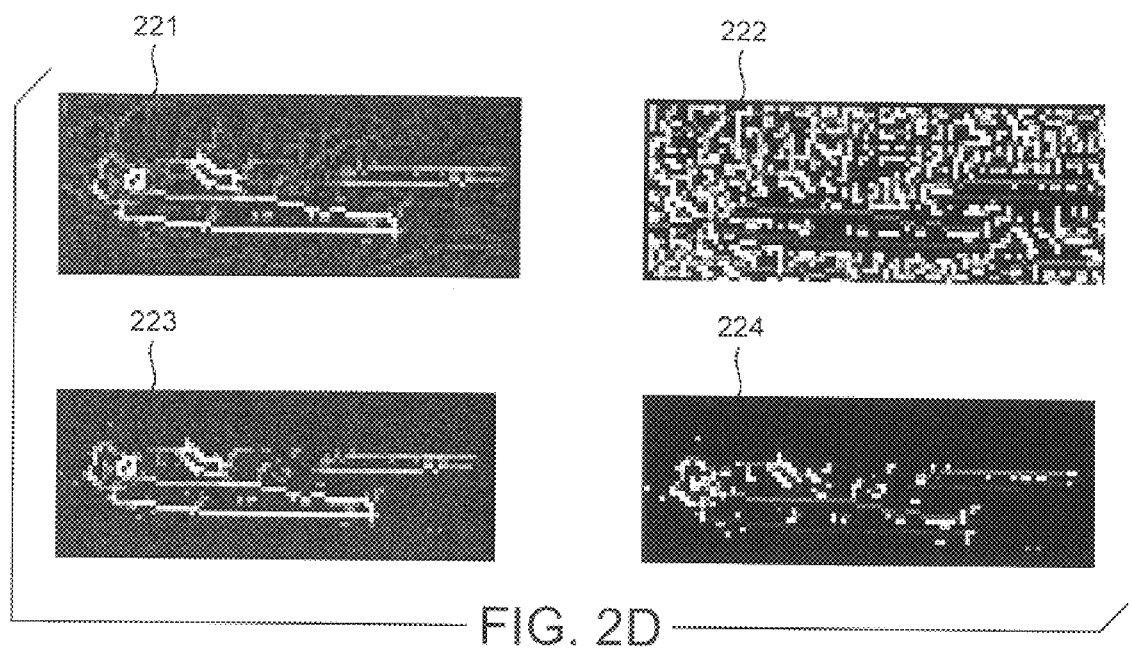
FIG. 2D is a diagram illustrating exemplary thinning and thresholding in accordance with the present invention.

Additional exemplary routines, e.g. edge thinning routine 220, and thresholding routine 230, in exemplary edge extraction section 200 are further illustrated in FIG. 2D. Edge thinning routine 220 may be described as a directionally guided magnitude filter. Each pixel in, for example, a magnitude image is compared to a subset of its neighbor. The direction of the pixel being examined further determines which of its neighbors the magnitude pixel will be compared with. Table 1 shows the 8-neighbor chart and direction numbers 203.

TABLE 1

| Magnitude and Direction Map |  |
|---|---|
| $X_1 X_4 X_7$ | 654 |
| $X_2 X_5 X_8$ | 73 |
| $X_3 X_6 X_9$ | 812 |
| Magnitude Location | Direction Mapping |

As an example, consider that the current pixel being examined is at location $X_5$. In accordance with exemplary edge thinning:

if the current pixel has direction 3 or 7, it is compared against its neighbors at $X_2$ and $X_8$;

if the current pixel has direction 1 or 5, it is compared against its neighbors at $X_4$ and $X_6$;

if the current pixel has direction 2 or 6, it is compared against its neighbors at $X_1$ and $X_9$; and if the current pixel has direction 4 or 8, it is compared against its neighbors at $X_3$ and $X_7$ If either neighbor pixel has a higher magnitude than the current pixel, and that neighbor has a direction within 90 degrees of the current pixel, then the current pixel is marked for deletion. Actual deletion of the pixels only occurs after each pixel in the image has been examined. Thus FIG. 2D shows the thinned edge magnitude image 221 and thinned direction image 222. After edge magnitude thresholding in thresholding routine 230 and allowing for about 20% of pixels to remain, as previously described, resulting magnitude edge image 223 and direction edge image 224 are further shown. For calculating edge direction weights in the template window, as in routine, 240 it should be noted that simple relative weights may preferably be applied. For example, in an exemplary template window having a size of 20×20 pixels, and 8 direction numbers 203, relative weights may be calculated simply by summing all pixels of each integer value of direction number 203 and dividing into the total number of pixels. If 50 pixels have direction number 203 at a value of 1, weighting for subsequent pixels of direction value 1 will be 400/50 or 8, 5 pixels have a value of 1, then weighting value will be 80, and so on. In general the more often a direction is present the lower the weight. It should be noted that a maximum weight should be established corresponding to direction numbers 203 which occur at or below a minimum number of times to avoid generating transient highly weighted pixels which may result from noise, dither, or jitter. Weights calculated in such a manner in routine 240, may be applied in correlator 300 as will be described in greater detail hereinafter.

Figure 3A:
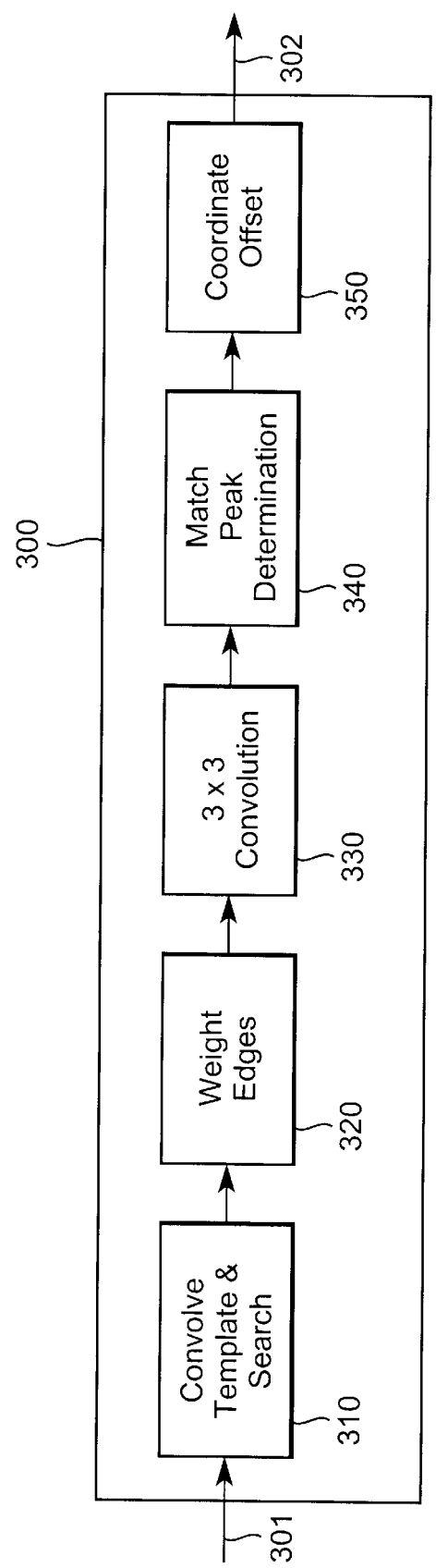
FIG. 3A is a flow diagram illustrating exemplary balanced template correlation in accordance with the present invention.
Figure 3B:
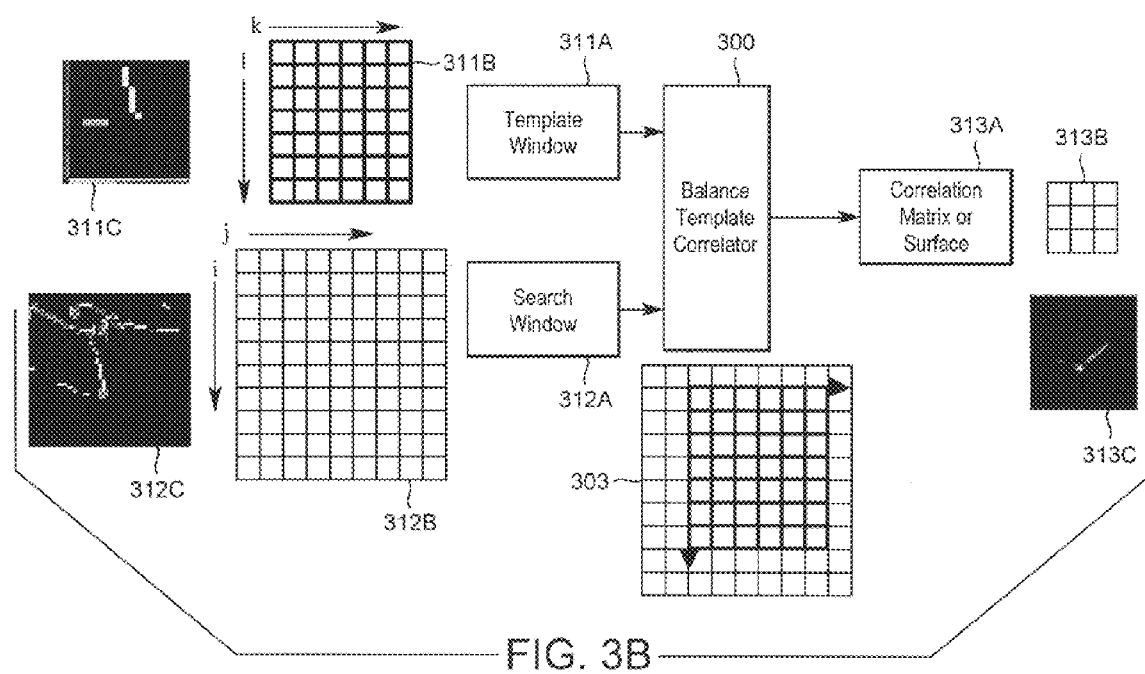
FIG. 3B is diagram further illustrating exemplary balanced template correlation in accordance with the present invention.
Figure 3C:
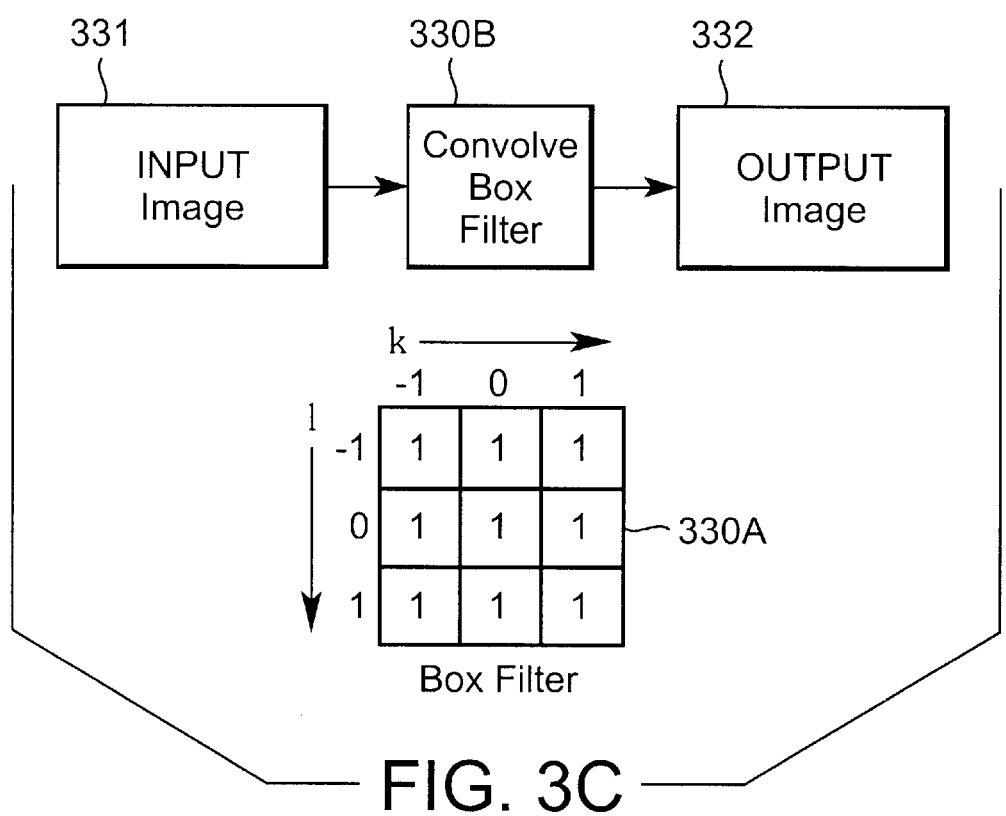
FIG. 3C is a diagram illustrating exemplary box filtering in accordance with the present invention.

It should be noted that the correlation process as performed for example, in balanced template correlator 130, may involve additional steps including comparing the template window edge direction image with the search window edge direction image as illustrated in FIG. 3A, FIG. 3B, and FIG. 3C. Such comparison may preferably be carried out, for example, in correlator 300 of FIG. 3A, by convolving, for example, template window edge direction image 311*a* and search window edge direction image 312*a* of FIG. 3B, for example, in routine 310 of FIG. 3A. Direction weights obtained in a manner as previously described, may be applied in routine 320 to each pixel which is common to both the template and the search window, which weights may be summed to form a correlation value. With particular reference to FIG. 3B, exemplary template window edge direction image 311*a* is a 6×7 pixel image 311*b* representing an object image 311*c* for the purposes of the following example. It should be noted however that a typical template window may be around 21×21 pixels, with an odd number of pixels in each row and column being typical. Search window edge direction image 312*a* is a 9×10 pixel image 312*b* representing larger search area image 312*c* from an image frame, typically around 256×256 pixels, from image sequence 101. Template window pixel image 311*b* may be 'slid' around pixel by pixel in search window pixel image 312*b* as shown at 303 and correlation value computed using balanced template correlator 300 for each location of the template inside the search window. The result of correlation at each unique position of template window pixel image 311*b* and search window pixel image 312*b* is correlation surface 313*a* which represents correlation surface pixel image 313*b*, and correlation surface image 313*c*.

As can be seen in FIG. 3A and in greater detail in FIG. 3C, a 3×3 convolution operator such as box filter 330*a* may be applied to the correlation surface image in routine 330 in FIG. 3A and 330*b* in FIG. 3C to smooth the correlation surface, prior to maximum point extraction. In FIG. 3A, routine 340, a peak determination is made based on maximum point extraction in the target and search windows. It should be noted that if the peak, or maximum correlation point, is less than a predetermined threshold, coordinate tracking coasts for that frame, otherwise the location of the maximum correlation point may be given in terms of coordinate offset in routine 350 and the new location may be marked as the target location and output provided to, for example, coordinate offset tracking routine 150, and/or target growth analysis routine 140 for further processing.

It should further be noted that in accordance with various exemplary embodiments of the present invention, correlation may be performed on edge magnitude and edge direction. Prior to correlation, for example in correlator 300, the number of pixels for each unique edge direction may be counted in the edge direction reference image. The pixel count may be used, for example, to calculate the weighting factor for each unique edge direction. Weighting, as applied in routine 320 as described herein above, may be used to determine the correlation value between the template window direction image and the search direction image. A template window edge direction image may be correlated with itself to compute an autocorrelation value. An autocorrelation value computed in such a manner may be used to determine a correlation quality value for subsequent frames which quality value may be computed as the autocorrelation value of the template window image divided by the correlation value of template window image with the search window image associated with the current frame of, for example, image sequence 101. Once the template window image has been acquired, a search window image or region, slightly larger than the size of the template window image or region, may be extracted from the base image of, for example, image sequence 101. Calculation of search window edge directions for the search window image or region is similar to the process performed for the template window image except for the application of a threshold. Instead of allowing for a fixed percentage of edges to remain in the search window image, the same threshold value used for the template window image may be applied to the search window image.

Edge direction correlation is similar to magnitude correlation, with some notable differences. For example, as a template window is slid around the search window, each edge direction pixel in the template window image is compared to a corresponding edge direction pixel in the search window image. If both edge directions are the same, then weighting computed for the template window edge direction is applied, otherwise the weight is zero. Once all pixels have been compared and weights applied, weights may be summed to form a correlation value for the edge direction for the current search window.

Again, as can be seen in FIG. 3C, if there is more than one maximum correlation value in the correlation surface, it may input as input image 331 and convolved at 330*b* with box filter 330*a* to provide a smoothed output image 332. Quality may be computed by taking the maximum correlation value of the search window associated with the current frame of, for example, image sequence 101, and dividing it by the autocorrelation value of the template window. When the quality value falls below a predetermined threshold, a flag may be switched to indicate a low correlation between the reference and search images. Since, in accordance with various exemplary embodiments in accordance with the present invention, a running history of the past quality values may be stored, for example, in a memory device a template window update may be performed, if the past several quality values have dropped below the threshold. Accordingly, each time quality drops below the threshold, the template window image may be examined to determine if there is a change in the size of the target.

It should be noted that the template image may be divided into four regions, e.g. top, bottom, left, and right. Each template region may be separately correlated with the search window image to determine if there is a difference between the maximum correlation location of the components versus the maximum correlation location of the entire reference image. For example, if independent correlations between the left and right components of the template window image indicate the components are moving further apart from each other, it can be assumed, for example, that target image scene is increasing in size as the sensor "closes in" towards the target. Accordingly, the size of the template may be increased to accommodate the change in size of the target image scene. If a template update is required, a new template window image may be extracted from the current frame of, for example, image sequence 101, and strong edge extraction routine 160 may be performed on the template window image extracted, as previously described, in routine 170. The threshold value for the edge magnitude may be computed based on the size of the template window image. As the template window image increases in size during, for example, target closure, the percentage of edge pixels allowed to exceed the threshold will decrease. Typically during the initial phases of target acquisition, 40% of edge pixels in the template window image are used and, during closure, as the reference image increases in size, the allowable edge pixels used decreases to 20%.

Further in accordance with various exemplary embodiments of the present invention, the template window image may be updated for range changes at a rate based on size growth associated with target features as, for example, a closing sequence progresses. Target size expansion within the template window may be a function of the rate of change between target range and absolute range. Equation 5 shown below represents the formula for calculating the template number:

$$r = r_0(1+k)^{-n} \tag{5}$$

where r0 is the start range, k is the percentage growth that is acceptable before a template update is required, and n may represent the template number which may further be solved for using the equation:

$$n = \frac{\log(r_0) - \log(r)}{\log(1+k)} \tag{6}$$

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes that come within the meaning and range of equivalents thereof are indicated to be embraced therein.

What is claimed is:

1. A method for tracking an object image in an image sequence, the method comprising:
   establishing a template window associated with the object image from a first image in the image sequence and extracting a first edge gradient direction associated with the template window;
   establishing a search window associated with the object image from a second image in the image sequence and extracting a second edge gradient direction associated with the search window;
   weighting the first and second edge gradient directions; and
   correlating the first and second edge gradient directions to track the object image over one or more images in the image sequence.

2. The method of claim 1, wherein the step of correlating further includes the step of providing a coordinate offset between a position of the object image in the search window and a position of the object image in the template window.

3. The method of claim 2, further including the step of updating the template window by establishing a new template window if the coordinate offset exceeds a predetermined value.

4. The method of claim 1, wherein the step of weighting further includes the step of calculating a set of weighting coefficients for the edge gradient direction associated with the search window and the template window respectively such that a balanced contribution is provided from edge gradient directions associated with the search window and the template window in the step of correlating.

5. The method of claim 1, further including the step of auto-correlating the edge direction gradient associated with the template window to determine a quality measure associated with the template window prior to the step of correlating.

6. The method of claim 1, wherein the step of extracting the second edge gradient direction associated with the search window further includes the steps of:
   sobel filtering the second edge gradient direction and an edge magnitude associated therewith;
   thinning the second edge gradient direction;
   thresholding the associated edge magnitude; and
   normalizing the second edge gradient direction if the associated edge magnitude is successfully thresholded.

7. An apparatus for tracking an object image, the apparatus comprising:
   an image sequence;
   a processor for receiving the image sequence, the processor configured to:
      establish a template window associated with the object image from a first image in the image sequence and extracting a first edge gradient direction associated with the template window;
      establish a search window associated with the object image from a second image in the image sequence and extracting a second edge gradient direction associated with the search window;
      weight the first and second edge gradient directions; and
      correlate the first and second edge gradient directions to track the object image over one or more images in the image sequence.

8. The apparatus of claim 7, wherein the processor, in correlating, is further configured to provide a coordinate offset between a position of the object image in the search window and a position of the object image in the template window.

9. The apparatus of claim 8, wherein the processor is further configured to update the template window by establishing a new template window if the coordinate offset exceeds a predetermined value.

10. The apparatus of claim 7, wherein the processor, in weighting, is further configured to calculate a set of weighting coefficients for the edge gradient direction associated with the search window and the template window respectively such that a balanced contribution is provided from edge gradient directions associated with the search window and the template window in correlating.

11. The apparatus of claim 7, wherein the processor is further configured to auto-correlate the edge direction gradient associated with the template window to determine a quality measure associated with the template window prior to the step of correlating.

12. The apparatus of claim 7, wherein the processor, in extracting the second edge gradient direction associated with the search window, is further configured to:
   sobel filter the second edge gradient direction and an edge magnitude associated therewith;
   thin the second edge gradient direction;
   threshold the associated edge magnitude; and
   normalize the second edge gradient direction if the associated edge magnitude is successfully thresholded.

* * * * *